United States Patent [19]

Takenaka

[11] Patent Number: 4,856,012
[45] Date of Patent: Aug. 8, 1989

[54] APPARATUS FOR CONTROLLING LIGHT OUTPUT OF A PULSE-EXCITED LASER OSCILLATOR

[75] Inventor: Hiroo Takenaka, Tokyo, Japan
[73] Assignee: NEC Corporation, Japan
[21] Appl. No.: 81,662
[22] Filed: Aug. 4, 1987
[30] Foreign Application Priority Data Aug. 6, 1986 [JP]  Japan .................................. 61-184781

[51] Int. Cl.⁴ ............................................... H01S 3/00
[52] U.S. Cl. ........................................ 372/38; 372/25; 372/29
[58] Field of Search ........................ 372/29, 30, 31, 33, 372/38, 9, 25

[56] References Cited
U.S. PATENT DOCUMENTS 3,172,056  3/1965  Stitch ...................................... 372/25
3,898,583  8/1975  Shuey ...................................... 372/38
4,345,330  8/1982  Howie et al. ........................... 372/29

OTHER PUBLICATIONS

Koechner, W., "Solid-State Laser Engineering", Springer-Verlag, New York, 1986.

*Primary Examiner*—William L. Sikes
*Assistant Examiner*—B. R. R. Holloway
*Attorney, Agent, or Firm*—Ostrolenk, Faber, Gerb & Soffen

[57] ABSTRACT

An apparatus for controlling light output of a pulse-excited laser oscillator which detects the energy level of laser light output and controls a driving circuit to interrupt the application of a driving voltage to a flash lamp when the level of laser light output is equal to a predetermined level so that a stable laser light output is obtained in each pulse in real time.

4 Claims, 4 Drawing Sheets

APPARATUS FOR CONTROLLING LIGHT OUTPUT OF A PULSE-EXCITED LASER OSCILLATOR

FIELD OF THE INVENTION

The invention relates to an apparatus for controlling light output of a pulse-excited laser oscillator, and more particularly to an apparatus for controlling light output of a pulse-excited laser oscillator in which light output is obtained dependent upon the discharge current flowing in a flash lamp.

BACKGROUND OF THE INVENTION

A conventional pulse-excited laser oscillator is described in "Volume 1, Solid-State Laser Engineering" by Walter Koechner in "Springer Series in Optical Sciences" published by Springer-Verlag New York Inc. in 1976. The laser oscillator comprises a charging unit including capacitors by which a predetermined voltage is applied to a flash lamp, and a trigger circuit which generates a driving voltage to be applied to a laser medium in accordance with the discharge current flowing in the flash lamp.

In operation, output energy of the laser oscillator is controlled to be a predetermined level in accordance with the amount and time duration of the discharge current flowing in the flash lamp. For this purpose, the charged voltage of the capacitors is precisely controlled such that the discharge current flowing in the flash lamp is maintained to be a predetermined value.

In the laser oscillator mentioned above, however, a constant output energy is difficult obtain because the output energy decreases in accordance with the decrease of light radiating from the flash lamp due to the deterioration of the flash lamp even if the charged voltage of the capacitors is maintained constant. In addition, in a case where repetition laser oscillation is performed, the output energy varies depending upon the repetition frequency of driving pulses because the temperature distribution varies in the laser medium dependent upon that frequency because the laser medium is heated by the flash lamp so that the change of light axis is induced in the laser medium even if the charged voltage is maintained constant so that the light amount of the flash lamp is of a predetermined level.

Another conventional pulse-excited laser oscillator is described in Japanese Utility Model laid open No 60-76050 (76050/1985). The laser oscillator comprises a power monitoring circuit including a PIN photodiode for converting laser light output to electric signal, an integrating circuit for integrating the output of the power monitoring circuit to produce a mean value thereof, a laser output controlling circuit for comparing the output of the integrating circuit with a predetermined laser output value, a feedback controlling circuit for comparing the discharge current or voltage of a flash lamp (to which the output of the laser output controlling circuit is added) with a predetermined discharge current or voltage, and a SCR controller which is controlled in accordance with the output of the feedback controlling circuit.

In operation, pulses which are output from the power monitoring circuit are integrated in the integrating circuit to output a mean value thereof. The mean value is compared in the laser output controlling circuit with the predetermined laser output value to output a subtracted signal of the two inputs thereto. The subtracted signal is added to the discharge current or voltage of the flash lamp whereby the added value is compared in the feedback controlling circuit with the predetermined discharge current or voltage to output a control signal. The SCR controller is controlled dependent upon the control signal to control a driving circuit so that a predetermined level of laser light output is obtained.

In the latter laser oscillator, however, a stable light output is not obtained in each pulse in real time because the pulses converted from laser light output in the power monitoring circuit are integrated in the integrating circuit thereby to produce a mean value of the pulses. Further, the laser light output and discharge current or voltage of the flash lamp are simultaneously sampled to control a laser oscillation so that the construction thereof and control sequence become complicated.

SUMMARY OF THE INVENTION

Accordingly, it is an object of the invention to provide an apparatus for controlling light output of a pulse-excited laser oscillator in which a constant output energy thereof is obtained even if a flash lamp is deteriorated.

It is a further object of the invention to provide an apparatus for controlling light output of a pulse-excited laser oscillator in which output energy thereof is not varied even if a laser medium is heated by a flash lamp in a case of a repetition laser oscillation.

It is a still further object of the invention to provide an apparatus for controlling light output of a pulse-excited laser oscillator in which a stable light output is obtained to be controlled in each pulse in real time.

It is a yet still further object of the invention to provide an apparatus for controlling light output of a pulse-excited laser oscillator in which the construction thereof and control sequence are simplified.

According to the invention, an apparatus for controlling light output of a pulse-excited laser oscillator comprises, means for driving a flash lamp to provide a discharge current flowing therein by applying a driving voltage thereto, means for detecting the energy level of the laser light output and means for comparing the energy level of the laser light output with a predetermined value, means for producing an interrupting signal when the energy level of the laser light output is equal to the predetermined value, and means for controlling the means for driving to interrupt the application of the driving voltage to the flash lamp when said interrupting signal is produced, the interruption of the driving voltage interrupting the flow of discharge current in the flash lamp, resulting in the interruption of laser oscillation.

BRIEF DESCRIPTION OF THE DRAWINGS

The invention will be explained in more detail in accordance with following drawings wherein.

DESCRIPTION OF THE PREFERRED EMBODIMENT

Before describing an embodiment according to the invention, a conventional pulse-excited laser oscillator which is described earlier as a latter laser oscillator will be described.

Figure 1:
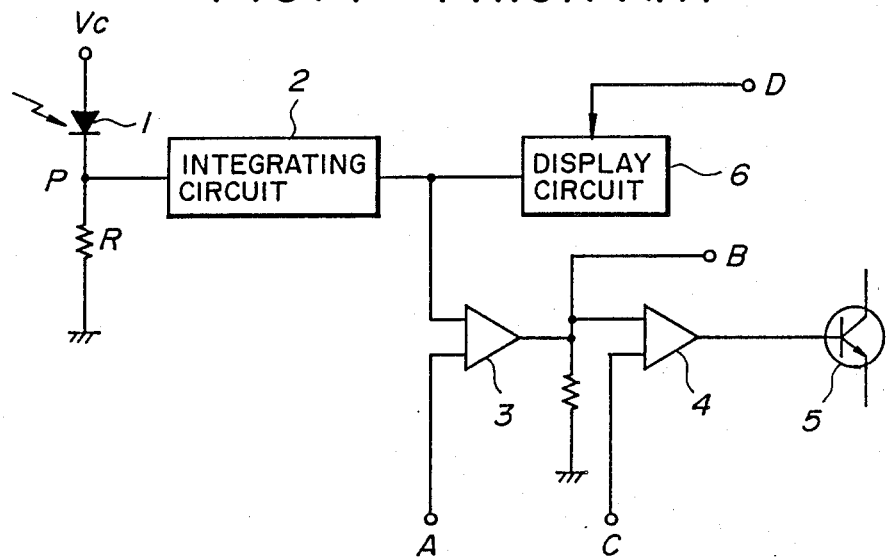
FIG. 1 is a circuit diagram showing a conventional pulse-excited laser oscillator.

FIG. 1 shows the aforementioned latter pulseexcited laser oscillator which comprises a power monitoring circuit including a PIN photodiode 1 which is connected through a resistance R to the ground and connected to a DC power supply voltage Vc, an integrating circuit 2 for integrating a voltage at a terminal P of the resistance R, a laser output controlling circuit 3 for comparing the output of the integrating circuit 2 with a predetermined laser output value applied to a terminal A, a feedback controlling circuit 4 for comparing the discharge current or voltage of a flash lamp applied to a terminal B (to which the output of the laser output controlling circuit 3 is added) with a predetermined discharge current or voltage applied to a terminal C, a SCR controller 5 which is controlled by the output of the feedback controlling circuit 4, and a display circuit 6 for displaying a digital value of the output from the integrating circuit 2 at sampling times which are determined by sampling signals applied to a terminal D.

Figure 2:
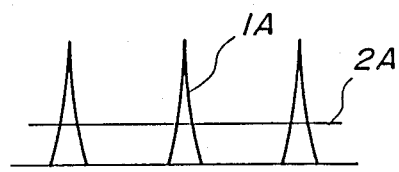
FIG. 2 is an explanatory diagram showing outputs of a power monitoring circuit and integrating circuit in the pulse-excited laser oscillator in FIG. 1.

In operation, pulses 1A which are output from the power monitoring circuit including the PI photodiode 1 in accordance with a voltage at the terminal P of the resistance R are integrated in the integrating circuit 2 to output a mean value 2A of the pulses 1A as shown in FIG. 2, although repeated explanations are omitted here in regard to an operation and disadvantage mentioned before.

Figure 3:
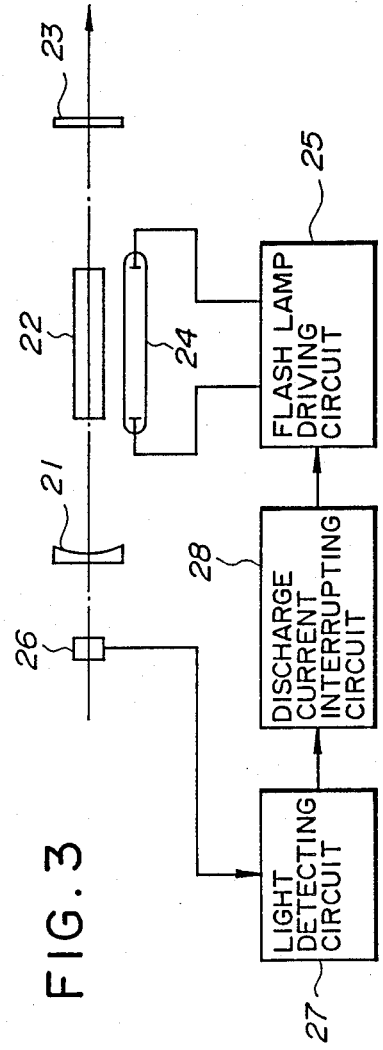
FIG. 3 is a block diagram showing an apparatus for controlling light output of a pulse-excited laser oscillator in an embodiment according to the invention.

Next, FIG. 3 shows an apparatus for controlling light output of a pulse-excited laser oscillator which comprises a total reflection mirror 21 for reflecting light output from a laser medium 22, an output mirror 23 for passing light output in an output direction of the laser medium 22, a flash lamp 24 in which the discharge current is flowed to generate a driving voltage across terminals of a trigger transformer, a flash lamp driving circuit 25 for applying a predetermined voltage to the flash lamp 24, a light detector 26 for detecting a part of the laser light output, a light detecting circuit 27 for comparing the laser light output in its level with a predetermined value, and a discharge current interrupting circuit 28 for controlling the flash lamp driving circuit 25 to interrupt the application of the predetermined voltage to the flash lamp 24.

In operation, a minute laser light which passes through the total reflection mirror 21 is detected by the light detector 26 to output a detecting signal which is compared in the light detecting circuit 27 with the predetermined value. If the detecting signal is equal in its level to the predetermined value, the discharge current interrupting circuit 28 controls the flash lamp driving circuit 25 to interrupt the application of the predetermined voltage to the flash lamp 24 so that the discharge current is interrupted to be flowed in the flash lamp 24.

Figure 4:
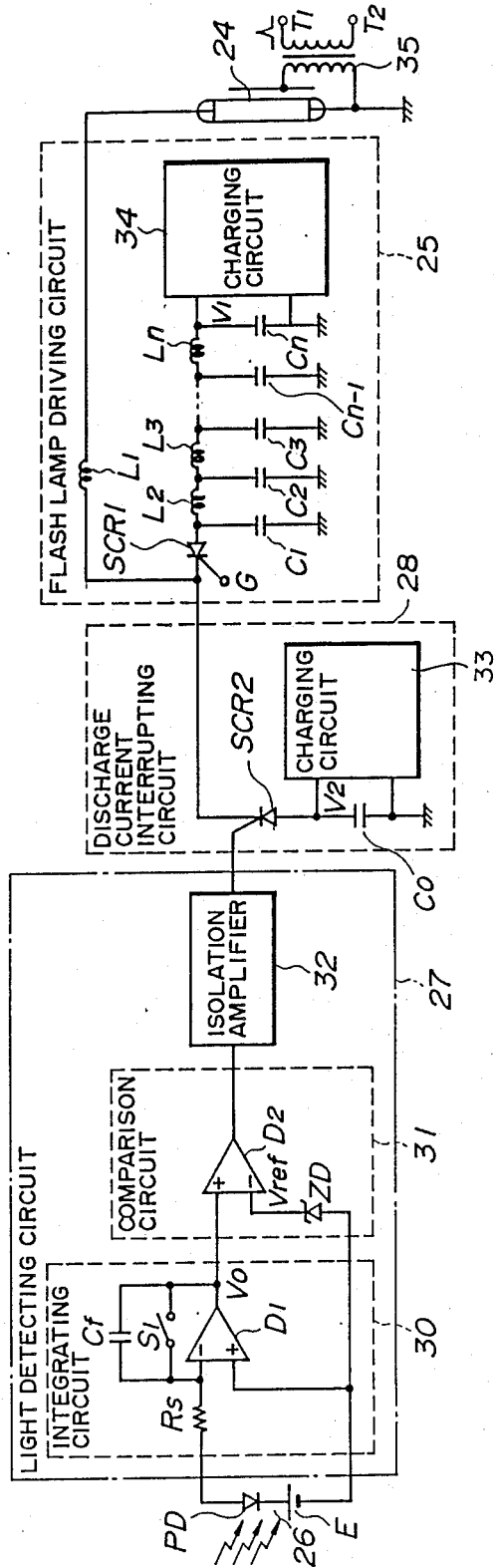
FIG. 4 is a circuit diagram showing the apparatus for controlling light output of a pulse-excited laser oscillator in the embodiment in FIG. 3 in more detail.

FIG. 4 shows the apparatus for controlling light output of a pulse-excited laser oscillator in the embodiment in FIG. 3 in more detail. In FIG. 4, a light detector 26 comprises a PIN photodiode PD and DC power source E, while a light detecting circuit 27 comprises an integrating circuit 30, a comparison circuit 31, and an isolation amplifier 32. The integrating circuit 30 comprises an operational amplifier $D_1$ in which a positive input terminal is connected to the DC power source E, and a negative input terminal is connected through a resistance $R_s$ to the PIN photodiode PD, an integrating capacitor $C_f$, and a switch $S_1$ which is parallel with the capacitor $C_f$ to be turned on when an output level $V_0$ of the circuit 30 is equal to a reference voltage $V_{ref}$. The comparison circuit 31 comprises an operational amplifier $D_2$ in which a positive input terminal is connected to the output of the light detecting circuit 30, and a negative input terminal is connected to a zener diode ZD from which the reference voltage $V_{ref}$ is output thereto. The reference voltage $V_{ref}$ is determined beforehand dependent upon a level of a laser output energy which is desired in a specified use. When the output level $V_0$ of the light detecting circuit 30 is equal to the reference voltage $V_{ref}$, the isolation amplifier 32 outputs a gate signal for a SCR2 of a discharge current interrupting circuit 28. At the same time, the switch $S_1$ is turned on to short circuit the capacitor $C_f$.

The discharge current interrupting circuit 28 comprises the aforementioned SCR2, a current interrupting capacitor C0 and a charging circuit 33 for charging the current interrupting capacitor Co. A charging voltage $V_2$ of the charging circuit 33 is selected to be larger than a charging voltage $V_1$ of a charging circuit 34 to be described later ($V_2 > V_1$).

A flash lamp driving circuit 25 comprises capacitors $C_1, C_2 \ldots C_n$ in parallel, inductors $L_2, L_3 \ldots L_n$ in series, and a SCR1 which is connected to a connecting point of the capacitor $C_1$ and inductor $L_2$ and through an inductor $L_1$ to one of electrodes of a flash lamp 24, in addition to the afornentioned charging circuit 34 for outputting the charging voltage $V_1$. When the SCR2 is turned on in accordance with the application of a control signal to a gate electrode G thereof, the charged voltage $V_1$ of the capacitors $C_1, C_2 \ldots C_n$ is applied to the flash lamp 24 to provide the discharge current therein.

Figure 5:
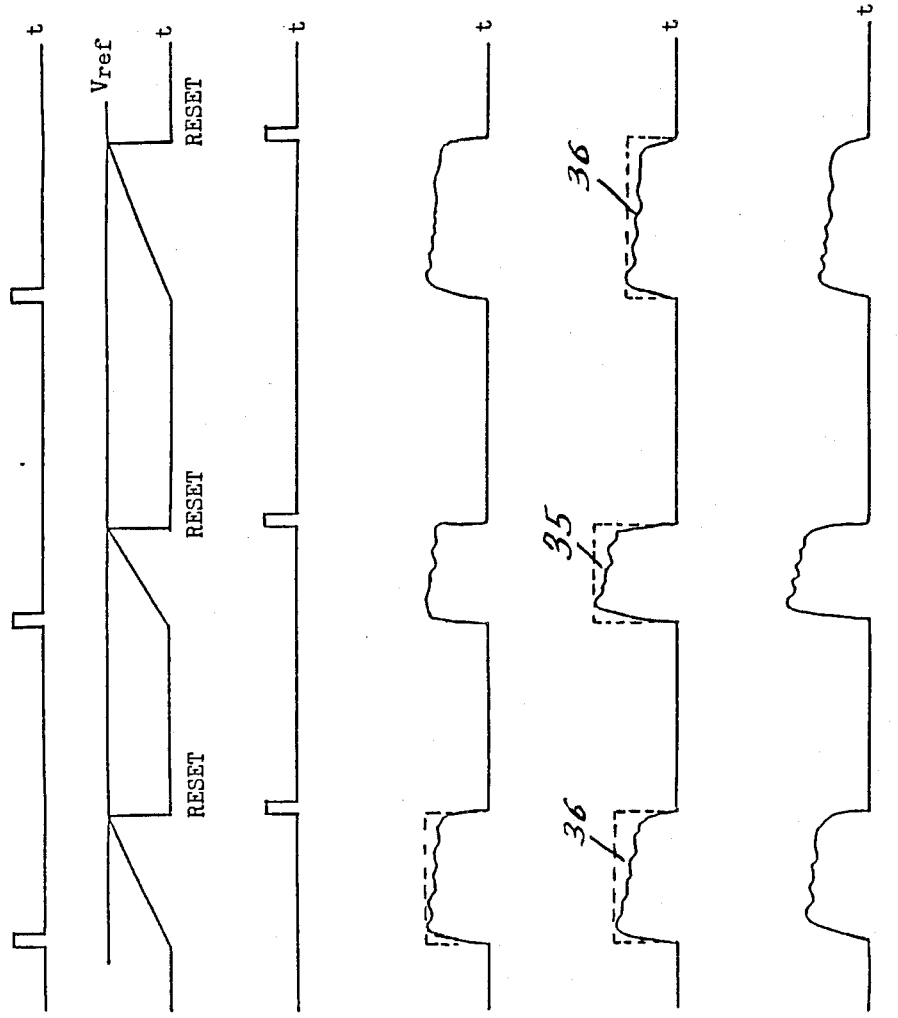
FIG. 5 is a timing chart showing an operation of the apparatus for controlling light output of a pulse-excited laser oscillator in the embodiment in FIG. 4.

FIG. 5 shows a timing chart in an operation of the apparatus for controlling light output of a pulseexcited laser oscillator in the embodiment according to the invention. In the flash lamp driving circuit 25, the charging circuit 34 charges the capacitors $C_1, C_2 \ldots C_n$ to be of the charged voltage $V_1$ so that the flash lamp 24 discharges to provide the discharge current therein, when the SCR1 is turned on in accordance with the application of the gate signal to the gate terminal G thereof. As a result, a high voltage pulse is generated across the terminals $T_1$ and $T_2$ of the trigger transformer 35 so that the laser light is emitted from the laser medium. The part of the laser light which is detected by the PIN photodiode PD of the light detector 26 is converted to electric signal and then integrated to output a voltage $V_0$ in the integrating circuit 30. The output voltage $V_0$ is compared in the comparison circuit 31 with the reference voltage $V_{ref}$ which is determined beforehand to correspond a laser output energy in a specified use. When the output voltage $V_0$ is increased to be equal to the reference voltage $V_{ref}$, the switch $S_1$ is turned on, while the comparison circuit 31 outputs the gate signal which is applied through the isolation amplifier 32 to the gate terminal of the SCR2 so that the SCR2 is turned on to apply the charged voltage $V_2$ of the interrupting capacitor Co to a cathode electrode of the SCR1. Consequently, the SCR1 is reversely biased to be turned off so that the discharge current to the flash lamp 24 is interrupted, resulting in the interruption of a laser oscillation.

Actually, even after the interruption of driving current by SCR1, a small amount of current flows to the flash lamp 24 from capacitor $C_o$ through SCR2. However, as shown in FIG. 4, capacitors $C_1, C_2 \ldots C_n$ are connected in parallel so that their capacitance adds and greatly exceeds $C_o$. Thus, the current from $C_o$ is negligible and the flash lamp 24 is essentially cut-off the instant SCR1 is reverse biased.

As shown in FIG. 5, the light emitted from flash lamp 24 is attenuated due when flash lamp 24, deteriorates Laser output energy curve 35 indicates a normal condition and curves 36 indicate a deteriorated condition. As is evident from FIG. 5, the area under curves 35 and 36 are equal to each other, but the amplitudes of the curves differ from each other.

Figure 6:
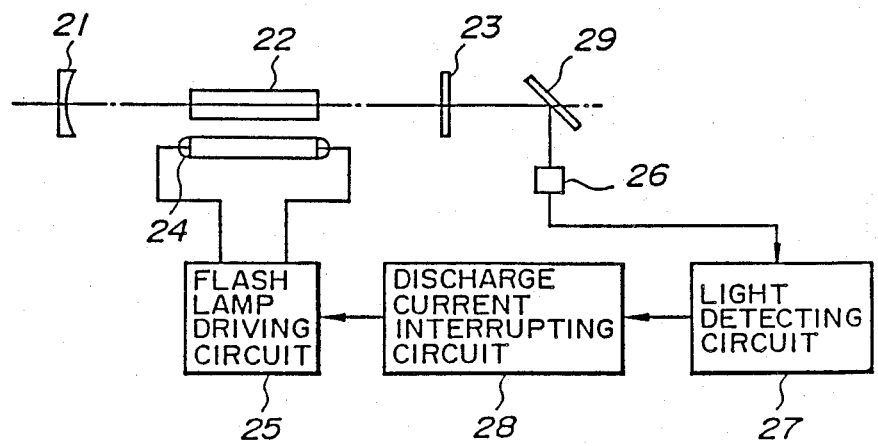
FIG. 6 is a block diagram showing an apparatus for controlling light output of a pulse-excited laser oscillator in another embodiment according to the invention.

In FIG. 6, there is shown an apparatus for controlling light output of a pulse-excited laser oscillator in another embodiment according to the invention in which like parts are indicated by like reference numerals in FIG. 3. The difference between the former and present embodiments in FIGS. 3 and 6 is that a half mirror (folded mirror) 29 is provided to reflect a part of laser light from a laser medium 22 so that the reflected light is detected by a light detector 26.

According to the apparatus for controlling light output of a pulse-excited laser oscillator in the present embodiment in FIG. 6, a laser light output is more stabilized because the monitoring light is detected from the laser light in the direction of an output end of a laser medium 22 thereby improving the controlling precision thereof.

As described above in detail, when a detected value proportional to a laser light output is equal to a predetermined reference value, a laser oscillation is instantly interrupted to be performed so that a constant laser output energy is stably obtained in each pulse in real time even if a flash lamp is deteriorated and a temperature distribution is varied in a laser medium. Accordingly, a processing condition is well established repeatedly, for instance, in a laser machining to provide a processed product of a good quality.

Although a pulse-excited laser oscillator is adopted in the former and latter embodiments, such a pulse operating laser as a quasi CW (Continuous Wave) excited laser etc. may be used in place thereof. For the purpose of the interruption of a laser oscillation, the discharge current is not always required to be interrupted. Alternatively, the interruption of a laser oscillation may be performed, when the discharge current is decreased below a threshold level for performing a laser oscillation.

Although the invention has been described with respect to specific embodiment for complete and clear disclosure, the appended claims are not to be considered limited thereby, but are to be construed as embodying all modification and alternative constructions that may occur to one skilled in that art which fairly fall within the basic teaching herein set forth.

What is claimed is:

1. An apparatus for controlling light output of a pulse-excited laser oscillator comprising, means for driving a flash lamp to provide a discharge current therein by applying a driving voltge thereto, means for detecting an energy level of laser light output and means for comparing said energy level with a predetermined value, means for producing an interrupting signal when said energy level is equal to said predetermined value, and means for controlling said means for driving to interrupt the application of said driving voltage to said flash lamp when said interrupting signal is produced , the interruption of said driving voltage interrupting the flow of discharge current in said flash lamp, resulting in the interruption of a laser oscillation.

2. An apparatus for controlling light output of a pulse-excited laser oscillator according to claim 1, wherein said means for driving comprises a plurality of capacitors which are charged up to said driving voltage, and a SCR which is turned on by a control signal applied to a gate terminal thereof to apply said driving voltage to said flash lamp, said means for detecting comprises a PIN photodiode for outputting an electric signal corresponding to said energy level of laser light output, and an integrating circuit including an integrating capcitor to be charged by said electric signal and a switch which is turned on when said interrupting signal is produced, resulting in the discharging of said integrating capacitor, and said means for controlling comprises an interrupting capacitor to be charged up to a voltage level which is larger than said driving voltage, and a SCR which is turned on by said interrupting signal whereby said SCR in said means for driving is turned off.

3. An apparatus for controlling light output of a pulse-excited laser oscillator according to claim 2, wherein said PIN photodiode is provided to receive a part of laser light output emitted from a side opposite to an output side of a laser medium.

4. An apparatus for controlling light output of a pulse-excited laser oscillator according to claim 2, wherein said PIN photodiode is provided to receive a part of laser light output emitted from an output side of a laser medium.

* * * * *